US010635710B2

(12) United States Patent
Sanio et al.

(10) Patent No.: US 10,635,710 B2
(45) Date of Patent: Apr. 28, 2020

(54) METHODS, SYSTEMS, AND MEDIA FOR PRESENTING RECOMMENDED CONTENT BASED ON SOCIAL CUES

(71) Applicant: Google LLC, Mountain View, CA (US)

(72) Inventors: Jason Robert Richard Sanio, Mountain View, CA (US); Martin Brandt Freund, Mountain View, CA (US)

(73) Assignee: Google LLC, Mountain View, CA (US)

( * ) Notice: Subject to any disclaimer, the term of this patent is extended or adjusted under 35 U.S.C. 154(b) by 345 days.

(21) Appl. No.: 15/804,734

(22) Filed: Nov. 6, 2017

(65) Prior Publication Data

US 2018/0060321 A1    Mar. 1, 2018

Related U.S. Application Data

(63) Continuation of application No. 14/042,335, filed on Sep. 30, 2013, now Pat. No. 9,811,521.

(51) Int. Cl.
*G06F 16/00*    (2019.01)
*G06F 16/48*    (2019.01)

(52) U.S. Cl.
CPC .................................. *G06F 16/48* (2019.01)

(58) Field of Classification Search
None
See application file for complete search history.

(56) References Cited

U.S. PATENT DOCUMENTS

| 2007/0067305 | A1* | 3/2007 | Ives | G06Q 30/02 |
| 2008/0126303 | A1* | 5/2008 | Park | G06F 16/735 |
| 2010/0287033 | A1* | 11/2010 | Mathur | G06Q 50/01 |
| | | | | 705/319 |
| 2012/0209632 | A1* | 8/2012 | Kaminski | G06Q 40/08 |
| | | | | 705/4 |
| 2012/0209832 | A1 | 8/2012 | Neystadt et al. | |
| 2012/0271825 | A1* | 10/2012 | Garthwaite | H04N 21/252 |
| | | | | 707/736 |
| 2013/0144871 | A1* | 6/2013 | Xia | G06F 16/78 |
| | | | | 707/727 |

OTHER PUBLICATIONS

Notice of Allowance dated Jul. 6, 2017 in U.S. Appl. No. 14/042,335.
Office Action dated Feb. 24, 2017 in U.S. Appl. No. 14/042,335.
Office Action dated Mar. 11, 2016 in U.S. Appl. No. 14/042,335.
Office Action dated Aug. 11, 2016 in U.S. Appl. No. 14/042,335.
Office Action dated Aug. 26, 2015 in U.S. Appl. No. 14/042,335.

* cited by examiner

*Primary Examiner* — Etienne P Leroux
*Assistant Examiner* — Farhad Agharahimi
(74) *Attorney, Agent, or Firm* — Byrne Poh LLP

(57) ABSTRACT

Methods, systems, and media for presenting recommended content based on social cues are provided. In accordance with some embodiments, a method for presenting recommended content is provided comprising: receiving a query associated with a user; generating a list of relevant media content items based on the query; selecting items for presentation to the user based on social relevance scores based on social connections of the user that have consumed a relevant item and contextual relevance scores for each item; causing the selected items to be presented to the user; and indicating that a particular item was consumed by a particular social connection.

21 Claims, 5 Drawing Sheets

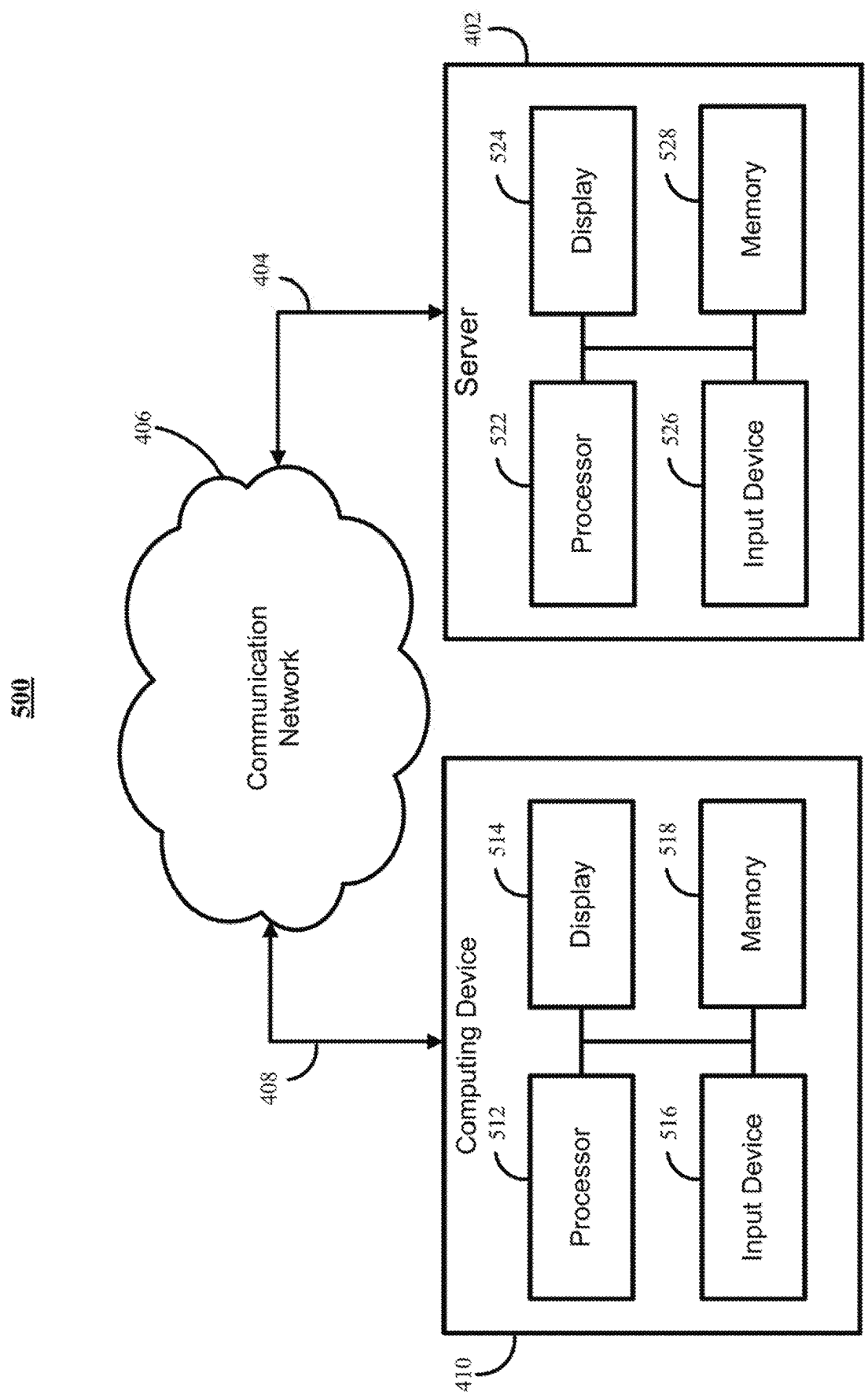

METHODS, SYSTEMS, AND MEDIA FOR PRESENTING RECOMMENDED CONTENT BASED ON SOCIAL CUES

CROSS-REFERENCE TO RELATED APPLICATION

This application is a continuation of U.S. patent application Ser. No. 14/042,335, filed Sep. 30, 2013, which is hereby incorporated by reference herein in its entirety.

TECHNICAL FIELD

The disclosed subject matter relates to methods, systems, and media for presenting recommended content based on social cues.

BACKGROUND

There is an overwhelming volume of content that is available to the average consumer. As the volume of content continues to increase, consumers are increasingly reliant on recommendation engines and search engines. Using these recommendation engines and search engines, content hosting services generally attempt to present content that is interesting to its users. In one particular example, some content hosting services allow users to create user profiles that indicate demographic information, such as gender or age, as well as areas of interest. These content hosting services then attempt to use such user profiles to select content to provide to each of its users. User profiles, however, do not take into account a vast amount of information that can be used to determine content that the user may enjoy consuming. One example of such information is the information associated with the social connections corresponding to the consumer.

Accordingly, it is desirable to provide methods, systems, and media for presenting recommended content based on social cues.

SUMMARY

In accordance with various embodiments of the disclosed subject matter, methods, systems, and media for presenting recommended content based on social cues.

In accordance with some embodiments of the disclosed subject matter a method for presenting recommended content is provided, the method comprising: receiving, using a hardware processor, a query associated with a user; generating a list of relevant media content items from a database of media content items based on the query; selecting at least one media content item from the list of relevant media content items for presentation to the user based at least in part on a social relevance score for each media content item and a contextual relevance score for each media content item, wherein the selecting further comprises: identifying one or more other users that are social connections of the user based on various user information of the user that is indicative of social connection with the other users; determining an influence score for each social connection based at least in part on social links between the user and the social connection; determining, for each social connection, which media content items of the relevant media content items have been consumed by that social connection; determining, for each relevant media content item consumed by a particular social connection, an engagement score indicative of a degree of engagement with the media content item by that social connection; and determining the social relevance score for each media content item in the list of relevant media content items based at least in part on the influence score and engagement score associated with each social connection that was determined to have consumed the media content item; causing the at least one selected media content item to be presented to the user as a selectable media content item; and causing an indication that a particular media content item of the presented media content items was consumed by a particular social connection to be presented in association with the particular media content item based at least in part on the engagement score of the particular social connection for the particular media content item.

In accordance with some embodiments of the disclosed subject matter, a system for presenting recommended content is provided, the system comprising: a hardware processor that is programmed to: receive a query associated with a user; generate a list of relevant media content items from a database of media content items based on the query; select at least one media content item from the list of relevant media content items for presentation to the user based at least in part on a social relevance score for each media content item and a contextual relevance score for each media content item, wherein the selecting further comprises: identify one or more other users that are social connections of the user based on various user information of the user that is indicative of social connection with the other users; determine an influence score for each social connection based at least in part on social links between the user and the social connection; determine, for each social connection, which media content items of the relevant media content items have been consumed by that social connection; determine, for each relevant media content item consumed by a particular social connection, an engagement score indicative of a degree of engagement with the media content item by that social connection; and determine the social relevance score for each media content item in the list of relevant media content items based at least in part on the influence score and engagement score associated with each social connection that was determined to have consumed the media content item; cause the at least one selected media content item to be presented to the user as a selectable media content item; and cause an indication that a particular media content item of the presented media content items was consumed by a particular social connection to be presented in association with the particular media content item based at least in part on the engagement score of the particular social connection for the particular media content item.

In accordance with some embodiments of the disclosed subject matter, a non-transitory computer-readable medium containing computer executable instructions that, when executed by a processor, cause the processor to perform a method for presenting recommended content is provided, the method comprising: receiving a query associated with a user; generating a list of relevant media content items from a database of media content items based on the query; selecting at least one media content item from the list of relevant media content items for presentation to the user based at least in part on a social relevance score for each media content item and a contextual relevance score for each media content item, wherein the selecting further comprises: identifying one or more other users that are social connections of the user based on various user information of the user that is indicative of social connection with the other users; determining an influence score for each social connection based at least in part on social links between the user and the social connection; determining, for each social connection, which media content items of the relevant media content items have been consumed by that social connection; determining, for each relevant media content item consumed by a particular social connection, an engagement score indicative of a degree of engagement with the media content item by that social connection; and determining the social relevance score for each media content item in the list of relevant media content items based at least in part on the influence score and engagement score associated with each social connection that was determined to have consumed the media content item; causing the at least one selected media content item to be presented to the user as a selectable media content item; and causing an indication that a particular media content item of the presented media content items was consumed by a particular social connection to be presented in association with the particular media content item based at least in part on the engagement score of the particular social connection for the particular media content item.

In accordance with some embodiments of the disclosed subject matter, a method for presenting recommended content is provided, the method comprising: receiving, using a hardware processor, a query associated with a user; receiving a list of relevant media content items, wherein the list of relevant media content items is generated from a database of media content items based on the query; determining that a social connection of the user has consumed at least one media content item from the list of media content items and a degree of engagement by the social connection with the at least one media content item; determining an importance of the social connection to the user based at least in part on past social interactions between the user and the social connection; ranking the list of relevant media content items based at least in part on the importance of the social connection and that social connections degree of engagement with each media content item from the list of media content items; selecting one or more relevant media content items to present to the user based on the ranking; causing the one or more selected media content items to be presented to the user as selectable media content items; and causing an indication that the social connection consumed the item of content to be presented in association with any selected media content item that the social connection was determined to have consumed.

In accordance with some embodiments of the disclosed subject matter, a system for presenting recommended content is provided, the system comprising: means for receiving a query associated with a user; means for generating a list of relevant media content items from a database of media content items based on the query; means for selecting at least one media content item from the list of relevant media content items for presentation to the user based at least in part on a social relevance score for each media content item and a contextual relevance score for each media content item, wherein the means for selecting further comprises: means for identifying one or more other users that are social connections of the user based on various user information of the user that is indicative of social connection with the other users; means for determining an influence score for each social connection based at least in part on social links between the user and the social connection; means for determining, for each social connection, which media content items of the relevant media content items have been consumed by that social connection; means for determining, for each relevant media content item consumed by a particular social connection, an engagement score indicative of a degree of engagement with the media content item by that social connection; and means determining the social relevance score for each media content item in the list of relevant media content items based at least in part on the influence score and engagement score associated with each social connection that was determined to have consumed the media content item; means for causing the at least one selected media content item to be presented to the user as a selectable media content item; and means for causing an indication that a particular media content item of the presented media content items was consumed by a particular social connection to be presented in association with the particular media content item based at least in part on the engagement score of the particular social connection for the particular media content item.

In some embodiments, the query is received as a search query specified by the user.

In some embodiments, the query is automatically generated based on metadata of a media content item consumed by the user.

In some embodiments, user information of the user that is indicative of social connection with the other users includes at least one of the following: the existence of reciprocal links in a social network between the user and the other user; information indicating that the user is a follower of the other user; and information indicating that the user and the other user have exchanged electronic messages.

In some embodiments, social links between the user and the social connection include at least one of: a designation of the social connection as a particular type of social connection by the user; a frequency of communication between the user and the social connection; a response time to communications from the social connection; and a frequency of interaction with items shared by the social connection on a social networking service on which the user is connected to the social connection.

In some embodiments, the engagement score is based at least in part on a percentage of the item of content consumed by the social contact.

In some embodiments, the media content item is a video.

In accordance with some embodiments, a system for presenting recommended content is provided, the system comprising: means for receiving a query associated with a user; means for receiving a list of relevant media content items, wherein the list of relevant media content items is generated from a database of media content items based on the query; means for determining that a social connection of the user has consumed at least one media content item from the list of media content items and a degree of engagement by the social connection with the at least one media content item; means for determining an importance of the social connection to the user based at least in part on past social interactions between the user and the social connection; means for ranking the list of relevant media content items based at least in part on the importance of the social connection and that social connections degree of engagement with each media content item from the list of media content items; means for selecting one or more relevant media content items to present to the user based on the ranking; means for causing the one or more selected media content items to be presented to the user as selectable media content items; and means for causing an indication that the social connection consumed the item of content to be presented in association with any selected media content item that the social connection was determined to have consumed.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 5 shows a detailed example of a user device and a server of FIG. 4 that can be used in accordance with some embodiments of the disclosed subject matter.

DETAILED DESCRIPTION

Figure 1:
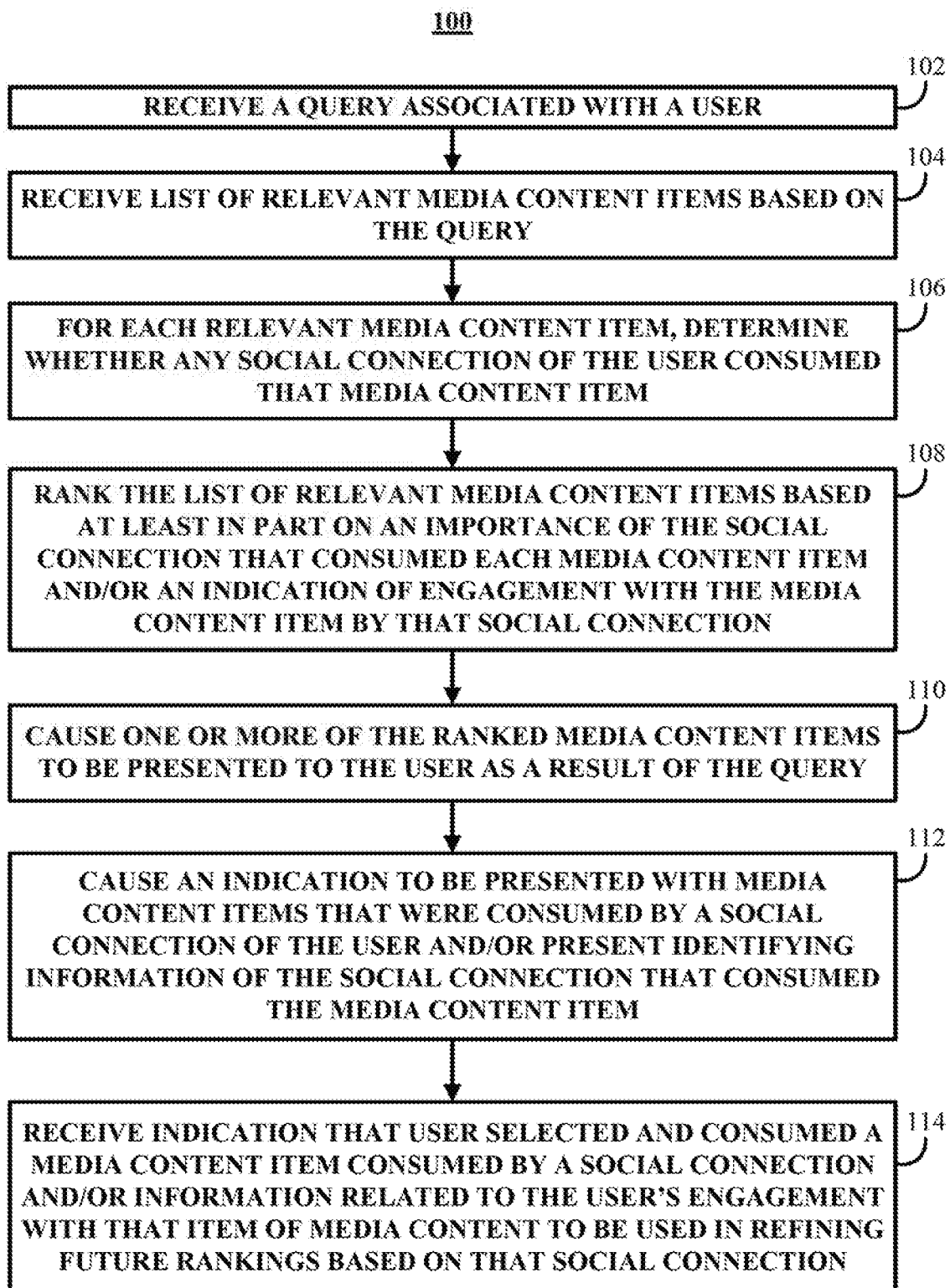
FIG. 1 shows an example of a process for presenting recommended content based on social cues in accordance with some embodiments of the disclosed subject matter.

In accordance with various embodiments, mechanisms (which can include methods, systems, and/or media) for presenting recommended content based on social cues.

In some embodiments, the mechanisms described herein can receive a request to identify recommended content to be presented to a user based on a query associated with the user. Recommended content can include any suitable media content item or items, which can include videos, images, articles, blog posts, any other suitable media content items, or any suitable combination of such media content items. In some embodiments, a request to identify recommended content can be received from any suitable source and can include a query associated with the user. For example, the request to identify recommended content can be issued in response to a user reaching the end of a media content item that is currently being consumed by the user. In this example, the query can be based on metadata of the media content item that is currently being consumed. Recommended content generated from such a query can be similar to the media content item that the user was consuming. In some embodiments, a list of relevant media content items can be generated based on the query.

In some embodiments, the list of relevant media content items can be ranked using any suitable factors for ranking the relevant media content items. For example, the relevant media content items can be ranked based on how closely the metadata or content of the media content items matches the query. As another example, the relevant media content items can be ranked based on the popularity of each of the relevant media content items. Additionally, in some embodiments, the relevant media content items can be ranked based on whether a particular relevant media content item was consumed by a social connection of the user associated with the query. In such embodiments, ranking can take into account an influence that a particular social connection is likely to have on the user. Determining such influence can be based on one or more factors that indicate how influential the social connection is likely to be, such as the way in which the user is connected to the social connection, how often the user communicates with the social connection, how similar the user's and the social connection's interests are, etc.

In some embodiments, the relevant media content can be ranked based on a degree of engagement with a relevant media content item by a social connection of the user. For example, if a social connection demonstrated a relatively high degree of engagement with a particular media content item, this can indicate that the particular media content item should be ranked more highly because the user will be more likely to demonstrate more engagement with the media content item. A degree of engagement with a media content item can be demonstrated from various actions performed by a user and/or a social connection of a user. For example, the more of a media content item that a user or social connection consumes, the higher the degree of engagement with the media content item. The amount of a media content item consumed can be measured using any suitable technique or combination of techniques and can be based on timing information, scrolling information, page requests, or any other suitable information. As another example, if a user or social connection provides a comment on a media content item (e.g., using a comments section, using a social messaging platform, etc.), this can demonstrate a greater degree of engagement with the media content item. As yet another example, if a user or social connection shares the media content item (e.g., using email, a social networking service, etc.), this can demonstrate a greater degree of engagement with the media content item.

In some embodiments, the influence of a social connection that has consumed a particular media content item and the degree of engagement of that social connection with the media content item can be used as social cues in ranking media content to be presented as recommended media content in response to a query. One or more of these social cues can be used to determine a likelihood that a user will enjoy, or at least engage with, a particular media content item. Presenting the user with media content items that the user is more likely to engage with as part of a recommendation can increase the likelihood that the user continues consuming content from a media content platform or video hosting service using the mechanisms described herein.

In some embodiments, one or more of the recommended media content items that are ranked based on social cues can be presented to the user as media content items that the user can select. Selection of the media content items can cause the selected media content item to be presented to the user. Additionally, in some embodiments, an indication can be presented with the media content items that have been consumed by a social connection indicating an identity of the social connection that consumed the media content item. This can further encourage the user to select the media content item because they may value the opinions of the social connection and/or may have similar tastes as the social connection.

In a more particular example, these mechanisms can determine social connections that are associated with the user. These social connections can include, for example, friends, family members, acquaintances, professional contacts, experts, etc. As described above, a subset of these social connections can be determined as being more influential and/or more important than other social connections to the user (e.g., based on category, based on past interactions, etc.). In response to the user consuming content, such as watching a particular video relating to cats, the mechanisms can analyze and use the social connections, information relating to the social connections, and/or other suitable social cues to determine contextually-relevant and socially-relevant videos for recommendation to the user. For example, the mechanisms can determine contextually-relevant videos based on the currently consumed video (e.g., based on keywords, metadata, captions, comments, hashtags, etc.) and then use social cues to determine a subset of the contextually-relevant videos that are also socially-relevant to the user. In addition, the mechanisms can provide an indicator that a social connection has interacted with the video (e.g., watched the video, recommended the video, rated the video, shared the video, etc.). In connection with the example above, in response to watching the video relating to cats, the mechanisms can recommend a subset of contextually-relevant videos (e.g., other videos relating to keywords, such as cats and humor) that are socially-relevant (e.g., based on a contextually-relevant video being shown to a social connection and based on performance with that social connection), where an indicator can be presented with one or more of these videos (e.g., a face image of a social connection within the video item indicating that the social connection watched and/or liked the video).

It should be noted that, although the embodiments described herein generally relate to presenting recommended video content items based on social cues, this is merely illustrative. Any suitable media content can be recommended to a user based on social cues, such as news content or images.

It should also be noted that, in situations in which the mechanisms described herein collect personal information about users, or may make use of personal information, the users may be provided with an opportunity to control whether programs or features collect user information (e.g., information about a user's social network, social actions or activities, a user's preferences, or a user's current location), or to control whether and/or how to receive content from the content server that may be more relevant to the user. For example, the users may be provided with an opportunity to provide authorization for collecting and/or analyzing user information from each individual program or application (e.g., a messaging application, a social networking application, a video playback application, etc.). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Turning to FIG. 1, an example of a process 100 for presenting recommended content based on social cues is shown in accordance with some embodiments of the disclosed subject matter. As shown in FIG. 1, process 100 can receive a query associated with a user at 102. In some embodiments, the query can be received in any suitable form and can be received based on a request initiated by the user, or automatically as part of a recommendation engine, or the like. For example, the query can be received based on search terms entered into a search user interface that is part of a media content platform (e.g., a platform for presenting text, images, videos, etc.) that the user is signed into. As another example, the query can be received based on the user submitting a request for recommended media content (e.g., by selecting a user interface element, or the like, for requesting recommended content) from a media content platform to which the user is signed in. As yet another example, the query can be received automatically based on one or more criterion being met, such as a particular event occurring. In a more particular example, the query can be received based on the user reaching the end of a particular item of media content (e.g., the end of a video, the end of an article, etc.). In another more particular example, the query can be received based on the user signing into or loading a media content platform. In yet another more particular example, the query can be received based on a predetermined period of time having passed since recommended content was last generated (e.g., a query to generate a list of recommended content can be presented periodically for a particular user).

In some embodiments, the query received at 102 can be based on any suitable inputs used to form the query. For example, the query received at 102 can be based on keywords, operators (such as AND, OR), etc., entered by a user in a search user interface (e.g., a search field as described below in connection with FIG. 3). As another example, the query received at 102 can be based on metadata of content that a user is currently consuming and/or has previously consumed. As yet another example, the query received at 102 can be based on metadata associated with the user with which the query is associated.

At 104, process 100 can receive a list of relevant media content items based on the query. In some embodiments, the list of relevant media content items can be generated using any suitable technique or techniques. For example, the query received at 102 can be used as an input to a process (running on the same or a different device than the device running process 100) for generating contextually relevant results based on the query. As another example, for certain queries (e.g., queries based on metadata from a particular media content item) lists of relevant media content items can be generated when the media content item is posted and/or periodically to incorporate newly posted content in the list of relevant media content for that media content item. In such an example, the query received at 102 can include identifying information that can be used to retrieve a list of relevant content from a database that includes lists of relevant content for certain queries that have already been performed.

In some embodiments, relevant media content can be determined using any suitable technique or combination of techniques. For example, a search engine can be used to generate a list of relevant media content items using the query as one input to the search engine. As another example, tags identifying a media content item as being relevant to a particular topic and/or a particular subject can be used in generating a list of relevant media content based on other content having the same or similar tags. As still another example, users can select certain media content items as being relevant to a particular media content item. As yet another example, a particular user (such as the owner of the content, an administrator, a group of users designated to make determinations as to which content is related, etc.) can create a curated list of media content items relevant to a particular media content item.

At 106, process 100 can determine, for each media content item in the list of relevant media content items received at 104, whether any social connection of the user is known to have consumed that media content item. In some embodiments, a social connection of the user can be any other user that is connected to the user through a social link. Social links can include, for example, affirmative connections on one or more social networking services (e.g., "following" the other user by creating a one-way connection to the user, by requesting a mutual connection to the other user, etc.). In some embodiments, such affirmative connections can be grouped by a user into various categories denoting the user's relationship to the other users that are social connections. Any suitable categories can be used, such as family, friend, acquaintance, business connection, etc. As another example, social links can include connections implied through interactions between the user and other users. Such interactions can include one-way communications such as email, voicemail, etc., and/or two-way communication such as video conferencing, phone calls, chats/instant messaging, etc. As yet another example, social links can include implied social connections that are determined based on observed actions of the user such as by consuming, rating, and/or commenting on media content items of the other user (e.g., media content items that are owned by, uploaded by, created by, etc., the other user). In some embodiments, social connections of the user can include only those users that have at least a threshold level of social links to the user, and that are users of the media content platform using process 100 (e.g., the other user has created an account associated with the media content platform, the other user has consumed and/or engaged with media content items on the media content platform, etc.).

It should be noted that, in situations in which the mechanisms described herein collect personal information about users, or can make use of personal information, the users can be provided with an opportunity to control whether programs or features collect user information (e.g., information about which media content items a user has consumed, information about engagement of a user with a media content item, etc.), or to control whether and/or how to receive instructions from the server to use social cues in ranking recommended media content. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a recommendation server and/or other server associated with the mechanisms described herein.

In some embodiments, each user can have an associated history that includes identifying information of media content items consumed by the user. Such a history can also include information related to the user's engagement with the media content item, as described below in connection with 108 of FIG. 1 and 208 of FIG. 2. In some embodiments, each time a user consumes a media content item (e.g., a video, article, etc.), identifying information of the media content item, engagement information, timing information, etc., related to the media content item can be stored in the history for that user. In some embodiments, history information is only stored for the user if the user affirmatively consents to the media content platform collecting such history information. Such affirmative consent can be given in any suitable form, such as through agreeing to terms of use for the media content platform, creating an account and/or signing into an account associated with the media content platform, selecting an option to receive recommendations in settings associated with a user account, any other suitable technique or techniques, or any suitable combination of such techniques.

In some embodiments, at 106, process 100 can check history information (or request that such history information be checked) of each social connection of the user with regard to each media content item included in the list of relevant media content items to determine whether a particular social connection consumed a particular relevant media content item. The history for each social connection can be checked using any suitable technique or combination of techniques. For example, histories for users can be maintained in a database, and the histories can be checked based on identifying information of the user and/or identifying information of the relevant media content item.

At 108, process 100 can rank the relevant media content items based at least in part on social cues related to each relevant media content item. Social cues can include whether a social connection of the user consumed the relevant media content item, a social influence of the social connection that consumed the relevant media content item (e.g., as described below in connection with 204 of FIG. 2), a level of engagement by the social connection with the relevant media content item (e.g., as described below in connection with 208 of FIG. 2), and/or any other social cues related to the relevant media content item. In some embodiments, a combination of these social cues can be used, at least in part, to rank the list of relevant media content items.

Additionally or alternatively, in some embodiments, other factors can be used to rank the list of relevant media content items. For example, each relevant media content item can be associated with a degree of contextual relevance that can reflect how relevant the media content item is to the query. Such a degree of contextual relevance can be determined using any suitable techniques, and can for example, reflect how similar the subject of a relevant media content item is to the subject of a media content item used as the basis for the query received at 102. As another example, a popularity of each relevant media content item can be used in determining the ranking of the media content items. The popularity of each relevant media content item can be based on various measurements of popularity, such as the total number of requests for the media content item, an acceleration or deceleration in requests for the media content item (e.g., a change in the number of requests per day, per week, etc.), a number of times the media content has been shared, the number of mentions and/or links to the content on social networking services, a popularity in a recent period of time, a measurement that the media content item has been viewed a consistent number of times since being uploaded to a content server, a rapidly growing number of views of the media content item that began with a low number of views, etc. As still another example, whether the relevant media content item is a featured media content item for any reason (e.g., because that media content item is especially popular, topical, affiliated with a user that is a featured user, etc.) can be used in ranking the media content items. Any other suitable factors can be taken into account when ranking the relevant media content items.

At 110, process 100 can cause one or more of the relevant media content items to be presented as a result of the query. In some embodiments, the results can be presented using any suitable technique or combination of techniques, and can be presented in any suitable location within a user interface for discovering and/or presenting media content items from a media content platform using process 100. For example, process 100 can cause a predetermined number of top ranked relevant media content items to be presented in a user interface portion for presenting media content from the media content platform. In such an example, the basis for the query received at 102 can be a media content item that the user is currently consuming (e.g., watching, reading, etc.) and which is presented in a particular portion of a user interface. The top relevant results returned in response to the query and ranked (e.g., as described above in connection with 108) can be caused to be presented in the area of a user interface that was being used to present the media content item that was the basis of the query. A more particular example is described below in connection with FIG. 3. As another example, process 100 can cause a predetermined number of top ranked relevant media content items to be presented in a portion of a user interface for consuming media content that is near a portion of the user interface used for presenting media content for consumption by the user (e.g., on a side of the user interface). As yet another example, process 100 can cause a predetermined number of top ranked relevant media content items to be presented in a portion of a home page or landing page of the media content platform as a list in a portion of the page for presenting a list recommended content that the user may wish to consume. As still another example, process 100 can cause a predetermined number of top ranked relevant media content items to be sent as a message to the user (e.g., as part of an email, text message, instant message, mobile application notification, etc.).

In some embodiments, the one or more ranked media content items can be presented in any suitable form. For example, the one or more ranked media content items can be presented as a list which can include links to the media content items, images (e.g., thumbnails), text (e.g., title, description, summary, etc.), a rating, a popularity, or any other suitable information. As another example, the one or more ranked media content items can be presented in a grid of recommended media content items that can include any suitable information about the ranked media content items.

At 112, process 100 can cause an indication to be presented with media content items that have been consumed by a social connection of the user. Any suitable indication can be presented to indicate that the media content item has consumed by a social connection of the user. Such an indication can, in some embodiments, be indicative of an identity of the social connection that consumed the media content. For example, an image associated with the social connection can be presented in association with the media content item (e.g., an image of the social connection can be retrieved from a social networking service). As another example, a username, handle, nickname, legal name, etc., of the social connection can be presented in association with the media content item. Alternatively, an indication can be silent as to the identity of the social connection (or social connections) that consumed the media content item, and merely indicate that a social connection (or a number of social connections) of the user consumed the media content item.

In some embodiments, multiple indications can be presented for a media content item that has been consumed by multiple social connections. In such embodiments, the indications can be presented in any suitable way to indicate that multiple social connections have consumed the media content item, such as by presenting the multiple indications as though they are stacked on top of one another, or using any other suitable technique or techniques for showing a user that there are multiple indications. Further, one or more of such indications can be presented more prominently than others of the indications. An order of presentation of the indications can be based on a determination as to the importance of each social connection with respect to the particular media content item that was consumed. Alternatively, in some embodiments, a single indication can be presented for a media content item that has been consumed by multiple social connections. In such embodiments, a social connection to be presented can be based on a determination as to the importance of each social connection with respect to the particular media content item that was consumed.

In some embodiments, an indication that a social connection has consumed a media content item can be presented only if it is determined that the social connection engaged with the media content item to a predetermined degree. For example, an amount of the media content item consumed or a percentage of the media content item consumed can indicate the engagement with the media content item. In another example, providing a rating for the media content item or sharing the media content item can indicate the engagement with the media content item. These and other examples of engagement with a media content item are described above in connection with 108 of FIG. 1 and below in connection with 208 of FIG. 2.

In some embodiments, an indication that a social connection has consumed a media content item can be presented only if the social connection took some public action regarding the media content item. Such a public action can include any suitable action that results in the user being able to discern that the social connection consumed the media content. For example, a public action can include the social connection sharing the media content item on a social network on which the user can view (or otherwise discern) the social connection's sharing of the media content item. In another example, a public action can include that the social connection commented on the media content item in a publicly-available comments section associated with the media content item. In yet another example, a public action can include that the social connection communicated with the user about the media content item (e.g., using any suitable messaging service). In yet a further example, a public action can include that the social connection provided an indication of liking the media content item (e.g., a like, a plus one, a thumbs up, or any other suitable positive indication).

At 114, process 100 can receive an indication that the user selected and consumed a media content item that was consumed by a social connection of the user. In some embodiments, such an indication can be used by process 100 when determining the importance of the social connection (e.g., as described above in connection with 108 of FIG. 1 and as described below in connection with 204 of FIG. 2). For example, if the user consumes a media content item that was consumed by a social connection, process 100 can use this information to determine that the social connection is more influential (e.g., because the user and the social connection have shown an interest in similar media content) with regards to at least a subject or topic of the consumed media content item.

Additionally or alternatively, at 114, process 100 can receive an indication of the user's engagement with the selected media content item that was consumed by the social connection. In some embodiments, the engagement of the user with the media content can be used by process 100 when determining the importance and/or influence of the social connection (e.g., as described above in connection with 108 of FIG. 1 and as described below in connection with 204 of FIG. 2). For example, if the user navigates away from the media content after a relatively short time and/or after consuming a relatively small portion of the media content item, this can indicate that the user is not interested in the media content. This can, in turn, indicate that the social connection should be given less importance in the future for media content like the media content item with low engagement by the user. As another example, if the user rates the media content poorly or otherwise indicates a dislike of the content, this can also indicate that the user is not interested in the media content.

Figure 2:
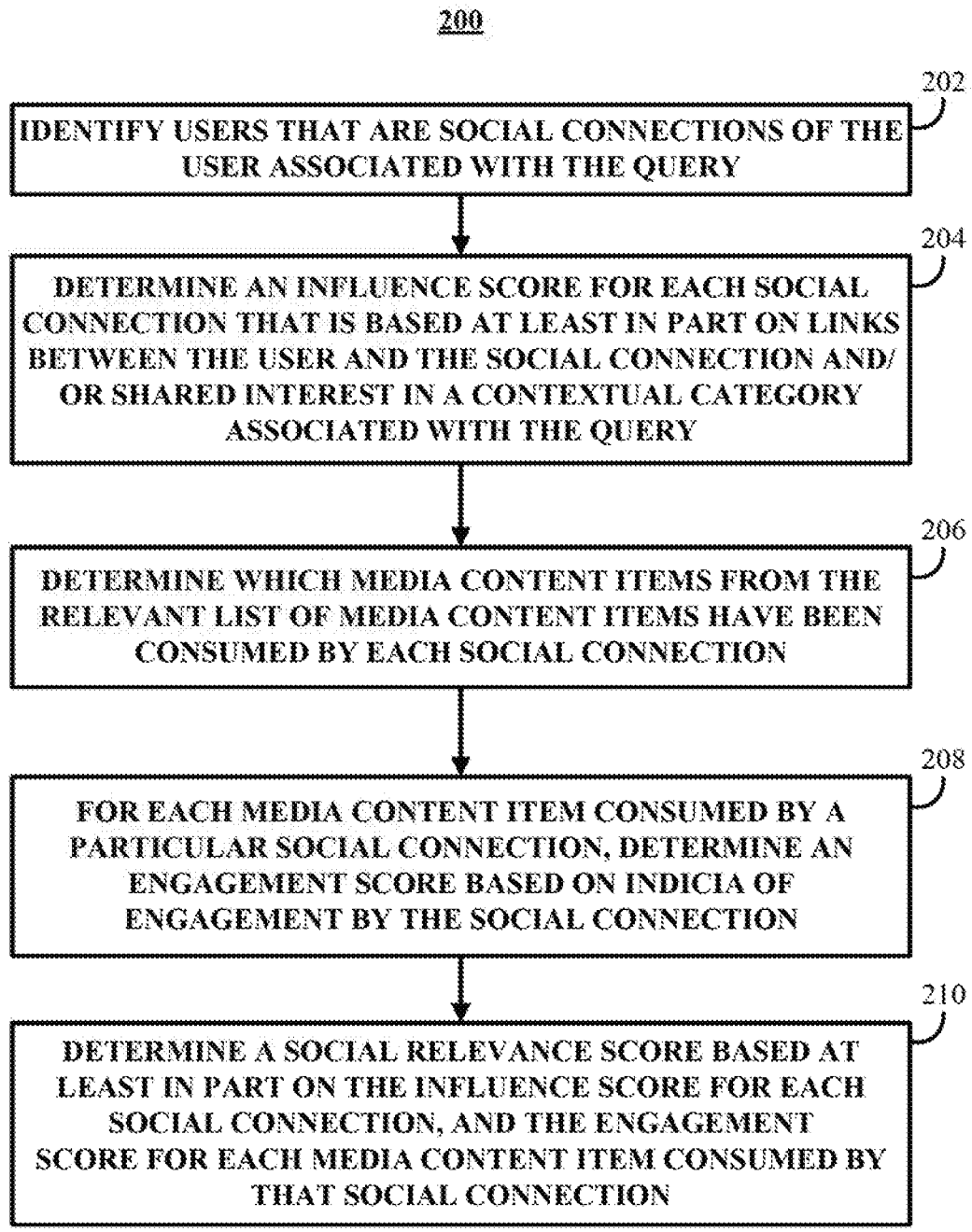
FIG. 2 shows an example of a process for ranking relevant content based on engagement with the content by social connections of a user in accordance with some embodiments of the disclosed subject matter.

Turning to FIG. 2, an example 200 of a process for determining a social relevance score for use in ranking media content items is shown in accordance with some embodiments of the disclosed subject matter. In some embodiments, process 200 can be used in determining the importance of social connections of a user and/or in ranking relevant media content items at 108 of process 100. At 202, process 200 can identify users that are social connections of the user associated with the query. Any suitable technique or combination of techniques can be used to identify social connections, for example, as described above in connection with 106 of FIG. 1. In some embodiments, process 200 can identify only social connections that have consumed media content in a list of relevant media content (e.g., as received at 104).

At 204, process 200 can determine an influence score for each social connection. Such an influence score can be specific to a particular media content item (e.g., based on the subject matter or a category of the media content item), and/or generally applicable to all media content items. In some embodiments, the influence score for a social connection can be based at least in part on social links between the user and the social connection. As described above in connection with FIG. 1, social links can include any suitable information that is indicative of a social relationship between the user and the social connection. In some embodiments, the influence score of a social connection can be an objective score for the social connection based on relevant factors. Additionally or alternatively, the influence score can be a subjective score for the social connection based on the user's social links to the social connection as compared to social links to other social connections. In some embodiments, an influence score can have an objective component and a subjective component. For example, the influence score can have objective components based on the number of times that the user has communicated with the social connection (e.g., via email, instant messaging, through a social messaging service, etc.). As another example, the influence score can have subjective components based on the number of times that the user has communicated with the social connection in comparison to the number of times that the user has communicated with other social connections.

In some embodiments, any suitable social links can be factored into the influence score using any suitable techniques in determining the influence of the social connection on the user. For example, the frequency and/or velocity of communication between the user and a social connection can be used to determine a social influence score. In this example, the velocity of communications can include how long a user takes to respond to a particular message from a social connection. Additionally, a type of message and/or communication that the user is sending, receiving, taking part in, and/or exchanging with the social connection can be used in determining an influence of the social connection. For example, messages and/or communications that are more personal and/or are real-time two-way communication can be weighted more highly than messages that are non-real-time or messages that are one-way communications (e.g., the social connection and/or the user never responds to the messages, or the messages are not intended to be responded to). In a more particular example, phone calls, video conferences, and instant messages can be weighted more highly than email, posting on the user or social connection's social network service profile, mentioning the user or social connection in a post on a social networking profile or social networking service, etc.

In some embodiments, social links can be aged out using any suitable technique or techniques, such that older communications, and the like, can be considered less important when determining an importance and/or influence score of a particular social connection. For example, a social link (e.g., communications, posts, etc.) can expire when it exceeds an age threshold. As another example, a weight associated with a particular social link can decay over time according to any suitable schedule. Additionally, these examples and/or any other suitable techniques can be used to give a higher weight to more recent social links between a user and a particular social connection in determining an influence score of that social connection. As another example, a classification of the social connection by the user can be used in determining the influence score for the social user (e.g., as described above in connection with 106 of FIG. 1 above).

In some embodiments, activity by the user and/or the social connection that indicates a real-world relationship between the user and the social connection can be used in determining a social influence score. For example, if the user and the social connection are in the same image (e.g., if the user and the social connection are tagged as being the subjects of an image) on a social networking service, or the like, this can indicate that the users have a real-world relationship. As another example, if the user and the social connection responded that they are both attending the same real-world event (e.g., a birthday party, a meeting), this can indicate that the users have a real-world relationship. As yet another example, if the user and the social connection are in the same location during a relatively short period of time (e.g., if the users both post their location to a social networking service), this can indicate that the users have a real-world relationship. In some embodiments, the more indications there are that the user and the social connection have a real-world relationship, the higher the influence score of the social connection can be.

In some embodiments, the influence score can be based at least in part on whether the user and the social connection share common interests. These common interests can be determined using any suitable techniques, such as subjects and/or categories of content that the user has identified as interests in a user profile on a social networking service, subjects and/or categories in which the user has shown an interest in comments and/or posts (e.g., based on words that the user used, tags that the user used, etc.), subjects and/or categories that the user has shown an interest in through consuming media content related to those subjects and/or categories, subjects and/or categories that the user has shown an interest in through search queries entered in a search engine by the user related to those subjects and/or categories, subjects and/or categories that the user has shown an interest in through purchases of products and/or services related to those subjects and/or categories. In some embodiments, certain subjects and/or categories can be excluded from analysis for any suitable reason, such as due to privacy concerns related to the subject and/or category, due to the subject and/or category having a social stigma, due to the subject and/or category being selected by the user as a subject and/or category to exclude from recommendations, and/or for any other suitable reason.

In some embodiments, the influence score can be based at least in part on the social connection being an influential user for a particular subject and/or category of media content. For example, a celebrity chef can be an influential user for media content related to food. As another example, a well-known sportscaster can be an influential user for media content related to sports. As yet another example, a well-known politician can be an influential user for media content related to politics and/or public policy. Any suitable technique or techniques can be used in determining whether a particular user is an influential user for a particular subject and/or category. For example, a number of other users that follow or subscribe to the user and the interests of those users can be used in determining a subject-specific influence of the user. As another example, information known about the user and that user's influence with regard to a particular subject and/or category of media content (e.g., based on articles and/or profile information of the user) can be used in determining a subject-specific influence of the user.

At 206, process 200 can determine which media content items from a list of relevant media content items (e.g., a list of relevant media content items received at 102, as described above in connection with FIG. 1) have been consumed by each social connection of the user (or if each social connection has consumed any of the relevant content items). Any suitable technique or techniques can be used to determine which media content items have been consumed by the user's social connections. For example, any of the techniques described above in connection with 106 of FIG. 1 can be used to determine whether a social connection of the user has consumed the media content item.

At 208, for each media content item consumed by a particular social connection of the user, process 200 can determine an engagement score based on indicia of engagement with the media content item by the social connection. In some embodiments, an indicia of engagement with the media content item can be used in determining the engagement score. These indicia can each indicate how engaged the social connection of the user was with the media content item. A level of engagement can be used as a proxy for how much the social connection enjoyed consuming the media content, how interesting the social connection found the media content, how passionate the social connection is about the subject of the media content, or any other emotions related to engagement with the media content.

In some embodiments, any suitable indicia of engagement with the media content can be used in determining a degree of engagement and/or an engagement score for a particular user (e.g., a user associated with a query, a social connection of the user, etc.). For example, an amount of the media content item consumed of the total media content item can be used as an indicia of engagement. In a more particular example, for timed media content, such as videos, music, podcasts, etc., a percentage of the media content item presented to the user can indicate the amount of engagement with the media content item. If a user stops, skips or otherwise navigates away from particular media content it can indicate that the user is not interested in the media content. As another example, a rating given to content by a user can be used as an indicia of engagement. In another more particular example, if the user rated the media content highly, this can indicate that the user was engaged with the media content. As yet another example, whether a user shared an item of media content can be used as an indicia of engagement. In yet another more particular example, if a user shares a media content item to a social networking service, via email, using a social messaging service, or shares the content using any other suitable technique or techniques, this can indicate that the user is highly engaged with the media content. As still another example, a number of times the user has consumed an item of media content and/or a total amount of time spent consuming the media content can be used as an indicia of engagement. In still another more particular example, if a user chooses to re-watch a video multiple times, this can indicate that the user is highly engaged with the video. In a further example, whether a user commented on a media content item and/or how many comments the user made about the media content item can be used as an indicia of engagement.

In some embodiments, different indicia of engagement by a particular social connection can be weighted and combined to calculate the engagement score. These indicia can be assigned any suitable values and/or can be normalized using any suitable technique or techniques. The weighted indicia can be combined using any suitable techniques, such as by computing a weighted average, by adding the weighted indicia, by multiplying the weighted indicia, and/or using any other suitable techniques.

In some embodiments, different indicia can have different weights. Such weights can be uniform across all users or can be individualized based on a particular user's actions. For example, if a particular user does not comment often on media content, an amount of commenting can be weighted more highly. This can be used to indicate that if a user commented on a particular media content item the user's engagement with the media content is considered higher because it is unusual for the user to comment. By contrast, for a user that comments on a large number of videos, but does not often re-watch videos, commenting can be weighted less highly and re-watching can be weighted more highly.

At 210, process 200 can determine a social relevance score for each social connection for a particular media content item and/or can determine an aggregated social relevance score across all social connections for a particular media content item. In some embodiments, the social relevance score can be based on the social influence score of a social connection that consumed the particular media content item and that user's engagement score for the particular media content item. In some embodiments, the influence score and the engagement score can be combined using any suitable technique and/or techniques. For example, the engagement score can be a multiplier for the influence score. As another example, the engagement score and the influence score can be averaged (or a weighted average can be performed, with the weights determined using any suitable technique or techniques). In some embodiments, the social relevance score can be normalized using any suitable technique or techniques. Additionally, scores from multiple social connections for the same media content item can be aggregated using any suitable techniques such as by averaging, adding, multiplying, and/or any other suitable technique.

In some embodiments, ranking of a list of relevant media content at 108 can include combining the social relevance score determined at 210 with a contextual relevance score that is based on a closeness between the media content item and the query. Additionally, the scores can be weighted based on a relative importance of the social relevance score and the contextual relevance score, which can depend on a type of query that is received, in some embodiments. For example, a query from a search field can give more importance (e.g., a higher weight) to a contextual relevance score, because the search results may be results that are most relevant to the query. On the other hand, a query for a recommendation upon reaching the end of a media content item can give more importance to the social relevance score, because the results may be results that are most likely to be attractive to the user (e.g., the results are intended to facilitate the user to consume more media content).

In some embodiments, as described above in connection with 108, other factors can be used in ranking the list of relevant media content, such as the popularity of the content, how recently the content was published, etc.

Figure 3:
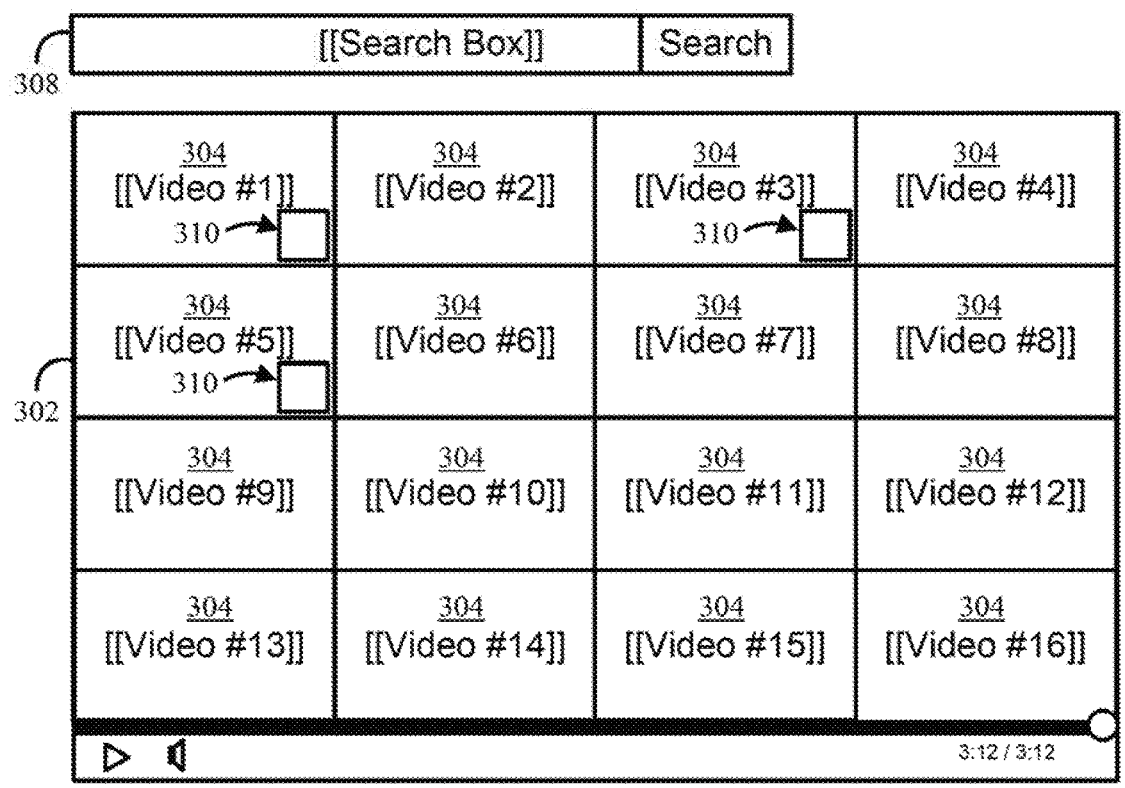
FIG. 3 shows an example of a user interface for presenting recommended content items based on social cues in accordance with some embodiments of the disclosed subject matter.

FIG. 3 shows an example 300 of a user interface for presenting one or more ranked media content items with an indication of a social connection that consumed the media content items in accordance with some embodiments of the disclosed subject matter. User interface 300 can be used, for example, to present media content items from a media content platform that provides access to media content items. As shown in FIG. 3, user interface 300 can include a media presentation portion 302, which can be used for presenting one or more media content items. In a more particular example, media presentation portion 302 can be used for presenting a video requested by a user (e.g., by selecting a video to play from a link, a list of videos, recommended videos, etc.).

In some embodiments, at the conclusion of a video being presented using media presentation portion 302, the mechanisms described herein can be used to generate a list of recommended videos 304 to be presented to the user in media presentation portion 302. Such recommended videos 304 can be generated using processes 100 and/or process 200, in which the query can be based on metadata or other data associated with the video that just concluded. As described above in connection with FIGS. 1 and 2, recommended videos 304 can be ranked using various factors, such as contextual relevance to the query (e.g., how similar the videos are to the video that just concluded), popularity, an influence of a social connection of the user that watched the video, a degree of engagement of a social connection of the user with the video, any other suitable factors, and/or any suitable combination of factors.

In some embodiments, recommended videos 304 can be presented in ranked order with the video with the highest ranking and/or highest score being presented at the top left and the ranking proceeding in order in a left to right fashion. It should be noted that the position at which the top ranked video is presented and how the subsequently ranked videos are presented can be based on cultural and/or social norms in a region in which the content it being presented. For example, in regions where the dominant language is written and read from left to right, the top ranked video (e.g., video #1) can be presented in the top-left corner, and the videos of lower rank can be presented from left to right. As another example, in regions where the dominant language is written and read right to left, the top ranked video can be presented in the top-right corner, and the videos of lower rank can be presented from right to left.

In some embodiments, the query can be associated with a user 306 that is signed into a media content platform that is being used to watch videos (e.g., a video being presented in portion 302, recommended videos 304, etc.). User 306 can be a user associated with queries used to generate a list of recommended media content items (e.g., videos) to present to the user. For example, the list of recommended media content items can include recommended videos 304, as shown in FIG. 3, but the mechanisms described herein are not limited to presenting recommended content to user 306 at the conclusion of other content being consumed by user 306. As another example, the list of recommended media content items can include a list of media content items returned in response to a query entered into search user interface 308. Other examples of techniques for generating queries and/or techniques for presenting a recommended media content items to a user are described above in connection with FIG. 1.

In some embodiments, an indicator 310 can be presented in association with videos that have been consumed by a social connection of the user. Indicator 310 can include any suitable information for indicating that a social connection of user 306 watched the video associated with indicator 310. For example, indicator 310 can include a profile picture of the social connection (e.g., from a profile of the social connection on a media content platform used for presenting recommended videos 304, from a profile of the social connection on a social networking service related to the media content platform used for presenting recommended videos 304, from a profile of the social connection on a social networking service that the social connection linked to the media content platform used for presenting recommended videos 304, etc.). As another example, selecting indicator 310 using any suitable technique (e.g., by hovering a pointer over indicator 310, by clicking on or touching a location that corresponds to indicator 310, etc.) can cause information about a social connection or social connections that consumed the media content to be presented. Such information can be presented using any suitable techniques. Presenting indicator 310 may, in some cases, make a user (e.g., user 306) more likely to watch a recommended video associated with indicator 310.

In some embodiments, indicator 310 can be presented only if the social connection that watched the video performed an action that can be seen by user 306 indicating that the user watched and/or engaged with the video (e.g., as described above in connection with 112 of FIG. 1). Additionally or alternatively, indicator 310 can be presented without identifying information about the social connection (e.g., if the social connection has not performed an action visible to user 306, if the social connection has certain privacy settings, in cases where identity information of social connections that consume a media content item are not disclosed, etc.). In some embodiments, recommended videos 304 can be presented without indicators 310 while still taking into account whether a social connection of the user watched a particular video when ranking recommended videos 304.

Although a particular technique is shown for presenting recommended videos 304 and indicators 310, this is not intended to be limiting and any suitable technique or combination of techniques can be used for presenting recommended videos 304 and indicators 310.

Figure 4:
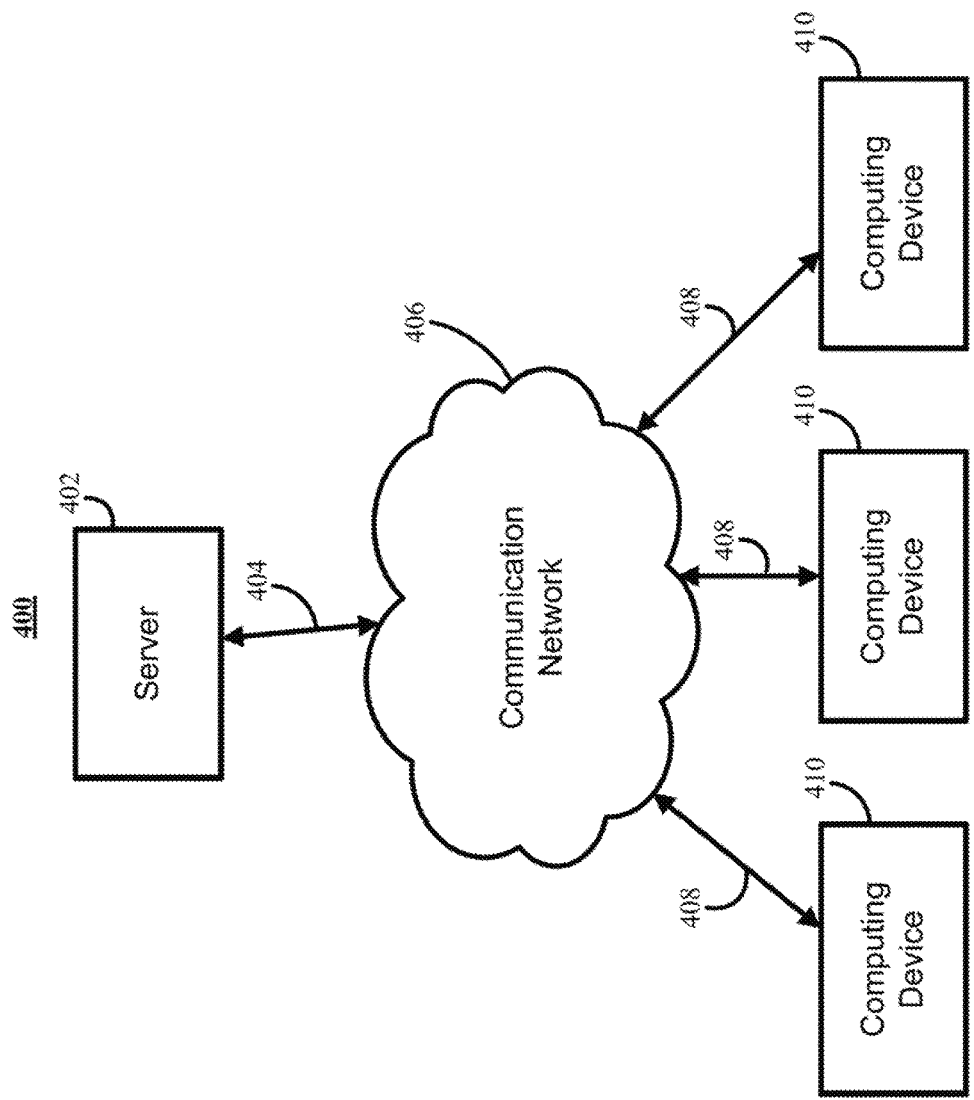
FIG. 4 shows a schematic diagram of an illustrative system suitable for implementation of the mechanisms described herein for presenting recommended content based on social cues in accordance with some embodiments of the disclosed subject matter.

FIG. 4 shows an example 400 of a generalized schematic diagram of a system on which the mechanisms for presenting recommended content based on social cues as described herein can be implemented in accordance with some embodiments. As illustrated, system 400 can include one or more user devices 410. User devices 410 can be local to each other or remote from each other. User devices 410 can be connected by one or more communications links 408 to a communication network 406 that can be linked to a server 402 via a communications link 404.

System 400 can include one or more servers 402. Server 402 can be any suitable server for providing access to the mechanisms described herein for presenting recommended content based on social cues, such as a processor, a computer, a data processing device, or any suitable combination of such devices. For example, the mechanisms for presenting recommended content based on social cues can be distributed into multiple backend components and multiple frontend components and/or user interfaces. In a more particular example, backend components, such as mechanisms for receiving queries for recommended content, generating lists of relevant content, ranking the relevant content to generate a list of recommended content, causing recommended media content items to be presented to a user, etc., can be performed on one or more servers 402. In another particular example, frontend components, such as presentation of a user interface for presenting the recommended media content, initiating queries for recommended content, presenting an indication that a social connection consumed a recommended media content item, etc., can be performed on one or more user devices 410.

In some embodiments, each of the user devices 410, and server 402 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 410 can be implemented as a personal computer, a laptop computer, a smartphone, a tablet computer, a mobile telephone, a wearable computer, a digital media receiver, a set-top box, a smart television, a home entertainment system, a game console, any other suitable computing device, or any suitable combination thereof.

Communications network 406 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 404 and 408 can be any communications links suitable for communicating data among user devices 410, and server 402, such as network links, dial-up links, wireless links, hard-wired links, any other suitable communications links, or any suitable combination of such links. Note that, in some embodiments, multiple servers 402 can be used to provide access to different mechanisms associated with presenting media content. For example, system 400 can include a media content discovery server 402 that facilitates discovery of media content available from a media content platform that uses the mechanisms described herein, a media content delivery server 402 that responds to requests for the media content by causing a request media content item to be presented to a user, a comment server 402 that receives comments associated with particular items of media content and causes at least a portion of the comments to be presented with the particular item of media content, and a recommendation server 402 that uses the mechanisms described herein to generate a list of recommended media content items based at least in part on social cues and causes one or more of the recommended media content items to be presented to a user based on a query associated with the user and determined using the mechanisms described herein.

FIG. 5 illustrates an example 500 of hardware that can be used to implement one or more of user devices 410, and servers 402 depicted in FIG. 4 in accordance with some embodiments of the disclosed subject matter. Referring to FIG. 5, user device 410 can include a hardware processor 512, a display 514, an input device 516, and memory 518, which can be interconnected. In some embodiments, memory 518 can include a storage device (such as a non-transitory computer-readable medium) for storing a computer program for controlling hardware processor 512.

Hardware processor 512 can use the computer program to execute the mechanisms described herein for presenting recommended content based on social cues in accordance with instructions received as a result of, for example, process 100 described above in connection with FIG. 1 and/or process 200 described above in connection with FIG. 2, and to send and receive data through communications link 408. In some embodiments, hardware processor 512 can send and receive data through communications link 408 or any other communication links using, for example, a transmitter, a receiver, a transmitter/receiver, a transceiver, or any other suitable communication device. Display 514 can include a touchscreen, a flat panel display, a cathode ray tube display, a projector, a speaker or speakers, and/or any other suitable display and/or presentation devices. Input device 516 can be a computer keyboard, a computer mouse, a touchpad, a voice recognition circuit, a touchscreen, and/or any other suitable input device.

Server 402 can include a hardware processor 522, a display 524, an input device 526, and memory 528, which can be interconnected. In some embodiments, memory 528 can include a storage device for storing data received through communications link 404 or through other links. The storage device can further include a server program for controlling hardware processor 522. In some embodiments, memory 528 can include information stored related to social connections of a user, information related to interactions between a user and social connections of the user, information related which items of media content have been consumed by each user, and/or any other suitable information, and hardware processor 822 can receive queries for recommended media content from user devices 410 and transmit instructions for presenting recommended media content based on social cues back to a user device 410 that requested the media content.

Hardware processor 522 can use the server program to communicate with user devices 410 as well as provide access to and/or copies of the mechanisms described herein. It should also be noted that data received through communications link 404 or any other communications links can be received from any suitable source. In some embodiments, hardware processor 522 can send and receive data through communications link 404 or any other communication links using, for example, a transmitter, a receiver, a transmitter/receiver, a transceiver, or any other suitable communication device. In some embodiments, hardware processor 522 can receive commands and/or values transmitted by one or more user devices and/or one or more users of server 402, such as a user that makes changes to adjust settings associated with ranking and/or presenting recommended media content based on social cues. Display 524 can include a touchscreen, a flat panel display, a cathode ray tube display, a projector, a speaker or speakers, and/or any other suitable display and/or presentation devices. Input device 526 can be a computer keyboard, a computer mouse, a touchpad, a voice recognition circuit, a touchscreen, and/or any other suitable input device.

In some embodiments, server 402 can be implemented in one server or can be distributed as any suitable number of servers. For example, multiple servers 402 can be implemented in various locations to increase reliability and/or increase the speed at which the server can communicate with user devices 410. Additionally or alternatively, as described above in connection with FIG. 4, multiple servers 402 can be implemented to perform different tasks associated with the mechanisms described herein.

In some embodiments, the mechanisms described herein can include server-side software, client-side software, server-side hardware, client-side hardware, firmware, or any suitable combination thereof. For example, these mechanisms can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor to execute the mechanisms described herein. For instance, these mechanisms can encompass a computer program written in a programming language recognizable by user device 410, and/or server 402 that is executing the mechanisms (e.g., a program written in a programming language, such as, Java, C, Objective-C, C++, C#, JavaScript, Visual Basic, HTML, XML, ColdFusion, any other suitable approaches, or any suitable combination thereof).

It should be noted that, in situations in which the mechanisms described herein collect personal information about users, or can make use of personal information, the users can be provided with an opportunity to control whether programs or features collect user information (e.g., information about which media content items a user has consumed, information about engagement of a user with a media content item, etc.), or to control whether and/or how to receive instructions from the server to use social cues in ranking recommended media content. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a recommendation server and/or other server associated with the mechanisms described herein.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the processes of FIGS. 1 and 2 can be executed or performed in any order or sequence not limited to the order and sequence shown and described in the figures. Also, some of the above steps of the processes of FIGS. 1 and 2 can be executed or performed substantially simultaneously where appropriate or in parallel to reduce latency and processing times. Furthermore, it should be noted that FIGS. 1 and 2 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for presenting recommended content based on social cues are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting recommended content, the method comprising:
receiving, using a hardware processor, a query associated with a user, wherein the query indicates a media content item currently being presented on a user device associated with the user;
determining, using the hardware processor, a group of relevant media content items based on the query;
selecting, using the hardware processor, at least one media content item from the group of relevant media content items for presentation to the user based at least in part on a social relevance score for each media content item and a contextual relevance score for each media content item, wherein the selecting comprises:
determining the social relevance score based on one or more users that are social connections of the user, wherein the one or more social connections of the user have been determined to have consumed the at least one media content item; and
determining the contextual relevance score that indicates a similarity of each media content item to the media content item currently being presented on the user device, wherein the at least one selected media content item is selected based on a relative importance of the social relevance score and the contextual relevance score, and wherein the relative importance is determined based on an origin of the received query; and
causing, using the hardware processor, the at least one selected media content item to be presented to the user as a selectable media content item in connection with an indication that the at least one selected media content item was consumed by a particular social connection of the user.

2. The method of claim 1, wherein selecting the at least one media content item from the group of relevant media content items further comprises determining an influence score for each of the one or more social connections based on social links between the user and each of the one or more social connections.

3. The method of claim 1, wherein selecting the at least one media content item from the group of relevant media content items further comprises determining an engagement score indicative of a degree to which a social connection enjoyed the at least one media content item.

4. The method of claim 1, wherein selecting the at least one media content item from the group of relevant media content items further comprises:
   determining a first weight associated with the social relevance score and a second weight associated with the contextual relevance score based on the relative importance of the social relevance score and the contextual relevance score; and
   ranking the group of media content items in the list of relevant media content items based on the social relevance score for each media content item weighted by the first weight and the contextual relevance score for each media content item weighted by the second weight, wherein the at least one selected media content item is selected based on the ranking.

5. The method of claim 1, wherein the one or more social connections include a designation of the social connection as a particular type of social connection by the user.

6. The method of claim 1, wherein the one or more social connections include a frequency of interaction with content items shared by the social connection on a social networking service on which the user is connected to the social connection.

7. The method of claim 1, wherein the one or more social connections include a frequency of communication between the user and the social connection.

8. A system for presenting recommended content, comprising:
   a memory; and
   a hardware processor that, when executing computer executable instructions stored in the memory, is configured to:
      receive a query associated with a user, wherein the query indicates a media content item currently being presented on a user device associated with the user;
      determine a group of relevant media content items based on the query;
      select at least one media content item from the group of relevant media content items for presentation to the user based at least in part on a social relevance score for each media content item and a contextual relevance score for each media content item, wherein the selecting comprises:
         determining the social relevance score based on one or more users that are social connections of the user, wherein the one or more social connections of the user have been determined to have consumed the at least one media content item; and
         determining the contextual relevance score that indicates a similarity of each media content item to the media content item currently being presented on the user device, wherein the at least one selected media content item is selected based on a relative importance of the social relevance score and the contextual relevance score, and wherein the relative importance is determined based on an origin of the received query; and
      cause the at least one selected media content item to be presented to the user as a selectable media content item in connection with an indication that the at least one selected media content item was consumed by a particular social connection of the user.

9. The system of claim 8, wherein selecting the at least one media content item from the group of relevant media content items further comprises determining an influence score for each of the one or more social connections based on social links between the user and each of the one or more social connections.

10. The system of claim 8, wherein selecting the at least one media content item from the group of relevant media content items further comprises determining an engagement score indicative of a degree to which a social connection enjoyed the at least one media content item.

11. The system of claim 8, wherein selecting the at least one media content item from the group of relevant media content items further comprises:
   determining a first weight associated with the social relevance score and a second weight associated with the contextual relevance score based on the relative importance of the social relevance score and the contextual relevance score; and
   ranking the group of media content items in the list of relevant media content items based on the social relevance score for each media content item weighted by the first weight and the contextual relevance score for each media content item weighted by the second weight, wherein the at least one selected media content item is selected based on the ranking.

12. The system of claim 8, wherein the one or more social connections include a designation of the social connection as a particular type of social connection by the user.

13. The system of claim 8, wherein the one or more social connections include a frequency of interaction with content items shared by the social connection on a social networking service on which the user is connected to the social connection.

14. The system of claim 8, wherein the one or more social connections include a frequency of communication between the user and the social connection.

15. A non-transitory computer-readable medium containing computer executable instructions that, when executed by a processor, cause the processor to perform a method for presenting recommended content, the method comprising:
   receiving a query associated with a user, wherein the query indicates a media content item currently being presented on a user device associated with the user;
   determining a group of relevant media content items based on the query;
   selecting at least one media content item from the group of relevant media content items for presentation to the user based at least in part on a social relevance score for each media content item and a contextual relevance score for each media content item, wherein the selecting comprises:
      determining the social relevance score based on one or more users that are social connections of the user, wherein the one or more social connections of the user have been determined to have consumed the at least one media content item; and
      determining the contextual relevance score that indicates a similarity of each media content item to the media content item currently being presented on the user device, wherein the at least one selected media content item is selected based on a relative importance of the social relevance score and the contextual relevance score, and wherein the relative importance is determined based on an origin of the received query; and
   causing the at least one selected media content item to be presented to the user as a selectable media content item in connection with an indication that the at least one selected media content item was consumed by a particular social connection of the user.

16. The non-transitory computer-readable medium of claim 15, wherein selecting the at least one media content item from the group of relevant media content items further comprises determining an influence score for each of the one or more social connections based on social links between the user and each of the one or more social connections.

17. The non-transitory computer-readable medium of claim 15, wherein selecting the at least one media content item from the group of relevant media content items further comprises determining an engagement score indicative of a degree to which a social connection enjoyed the at least one media content item.

18. The non-transitory computer-readable medium of claim 15, wherein selecting the at least one media content item from the group of relevant media content items further comprises:
  determining a first weight associated with the social relevance score and a second weight associated with the contextual relevance score based on the relative importance of the social relevance score and the contextual relevance score; and
  ranking the group of media content items in the list of relevant media content items based on the social relevance score for each media content item weighted by the first weight and the contextual relevance score for each media content item weighted by the second weight, wherein the at least one selected media content item is selected based on the ranking.

19. The non-transitory computer-readable medium of claim 15, wherein the one or more social connections include a designation of the social connection as a particular type of social connection by the user.

20. The non-transitory computer-readable medium of claim 15, wherein the one or more social connections include a frequency of interaction with content items shared by the social connection on a social networking service on which the user is connected to the social connection.

21. The non-transitory computer-readable medium of claim 15, wherein the one or more social connections include a frequency of communication between the user and the social connection.

* * * * *